United States Patent [19]
Cooke et al.

[11] Patent Number: 5,126,414
[45] Date of Patent: Jun. 30, 1992

[54] CONTROL OF OLIGOMER LEVEL IN LOW PRESSURE POLYETHYLENE REACTOR SYSTEMS

[75] Inventors: Quentin S. Cooke, Werribee; Glyarpuram N. Prasad, Lower Templestowe, both of Australia; John J. Schlueter, Jr., Mount Pleasant, S.C.; Grace O. Tsien, Colonia, N.J.

[73] Assignee: Mobil Oil Corporation, Fairfax, Va.

[21] Appl. No.: 794,184

[22] Filed: Nov. 19, 1991

Related U.S. Application Data
[63] Continuation of Ser. No. 774,665, Oct. 11, 1991.

[51] Int. Cl.$^5$ .............................................. C08F 2/34
[52] U.S. Cl. ............................... 526/68; 526/88; 526/351; 526/352
[58] Field of Search ............... 526/68, 88, 70, 77, 526/67

[56] References Cited

U.S. PATENT DOCUMENTS
4,543,399  9/1985  Jenkins, III et al. ................. 526/68
5,028,670  7/1991  Chinh et al. ........................... 526/88

*Primary Examiner*—Joseph L. Schofer
*Assistant Examiner*—David Wu
*Attorney, Agent, or Firm*—Alexander J. McKillop; Charles J. Speciale; Marina V. Schneller

[57] ABSTRACT

In accordance with the invention, the process comprises substantially eliminating distributor plate fouling in fluid bed reactor alpha olefin polymerizations, by removing oligomers from the recycle feeds to the fluid bed reactor. In accordance with the invention, the process comprises substantially eliminating gel production in the low pressure production of polymers and copolymers of ethylene. Unexpectedly, the process of the invention, which substantially eliminates distributor plate fouling also results in polymer products which are substantially free of gels.

10 Claims, 2 Drawing Sheets

CONTROL OF OLIGOMER LEVEL IN LOW PRESSURE POLYETHYLENE REACTOR SYSTEMS

CROSS REFERENCE TO RELATED APPLICATIONS

This application is a continuation of copending application Ser. No. 07/774,665 filed Oct. 11, 1991, which is relied upon and incorporated by reference herein.

FIELD OF THE INVENTION

The invention relates to modifications, as well as improvements, of low pressure fluid bed gas phase systems for the polymerization and copolymerization of ethylene. The invention relates to maintaining the continuous operation of the distributor plate in the fluid bed gas phase reactor. Moreover, the invention relates to maintaining the continuous production of products of polymerization and copolymerization of ethylene, substantially uncontaminated by gels, which interfere with appearance and, in severe cases, performance of the products in end-use applications.

BACKGROUND OF THE INVENTION

Developments in low pressure fluid bed gas phase polymerization and copolyermization of ethylene began to appear in the patent literature over a decade ago. Prior to these developments low density polyethylene was produced at high pressure, at least 15000 psi, homopolymerization of ethylene in the gas phase in stirred and elongated tubular reactors in the absence of solvents using free radical initiators. On a world wide basis, the amount of low density polyethylene produced in this fashion, annually, amounted to more than thirteen billion pounds.

Then it was discovered that the low density polyethylene could be produced commercially at pressures of less than 1000 psi in a gas phase reaction in the absence of solvents by employing selected chromium and titanium (and, optionally fluorine) containing catalysts under specific operating conditions in a fluid bed process. The products of those original processes exhibited broad molecular weight distribution and thus were limited in their application to wire and cable insulation and pipe production. Because of poor optical and mechanical properties, the products were not broadly used in film applications.

To be commercially useful in the gas phase fluid bed process, the catalyst therefor must exhibit high activity, with concomittant high product productivity, because gas phase process systems do not usually include catalyst residue removal procedures. Accordingly, catalyst residue in the polymer product must be so small that it can be left in the polymer without causing any undue problems in the fabrication and/or to the ultimate consumer, as reported in U.S. Pat. No. 4,302,566. To this end, the patent literature is replete with developments of new catalysts, of high activity with correlative high productivity values.

Certain low pressure fluid bed gas phase processes employing high activity catalysts produce high levels of gel in the polyethylene homopolymer and copolymer product. These gels are very high molecular weight species. The presence of gels in the polymer product causes poor film appearance and, in severe cases, causes unsatisfactory performance in end-use applications. Such problems have been experienced in both blown-films and blow-molded bottles.

An independently, although concurrent, observable result is fouling of the distributor plate in the fluid bed reactor. Fouling of the distributor plate in the fluid bed reactor reduces the ability to operate the reactor continuously.

Accordingly, it is an object of the invention to substantially reduce, preferably to substantially eliminate the gels found in the polymer products produced in the low pressure fluid bed gas phase polymerizations of ethylene.

Accordingly, it is another object of the invention to substantially reduce, preferably to substantially eliminate fouling of the distributor plate in the fluid bed reactor, since fouling of the distributor plate in the fluid bed reactor reduces the ability to operate the reactor continuously.

SUMMARY OF THE INVENTION

We determined that fouling of the distributor plate, in these low pressure fluid bed gas phase polymerizations of ethylene resulting in gel containing products, was due to production of oligomers which are $C_8$–$C_{20}$ hydrocarbons and which are probably straight chain hydrocarbons.

In accordance with the invention, the process comprises substantially eliminating distributor plate fouling by removing oligomers from the recycle feeds to the fluid bed reactor. In accordance with the invention, our process comprises substantially eliminating gel production in the low pressure production of polymers and copolymers of ethylene. Unexpectedly, the process of the invention, which substantially eliminates distributor plate fouling also results in polymer products which are substantially free of gels.

DESCRIPTION OF THE DRAWING(S)

DETAILED DESCRIPTION OF THE INVENTION

Hydrocarbons in the Reactor

Polyethylene polymers, as well as copolymers of ethylene with one or more $C_3$–$C_{10}$ alpha-olefins can be produced in accordance with the invention. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of, e.g., at least 1 percent by weight of the polymer. Accordingly, ethylene/propylene copolymers are possible, but not preferred. A highly active supported catalyst system appears to yield a fluid bed product having an average particle size between about 0.005 to about 0.07 inches and preferably about 0.02 to about 0.04 inches.

The products are prepared in the presence of catalysts under fluid bed catalytic polymerization conditions described below. As described above oligomer production can occur, followed by prospective polyoil production which is eliminated in accordance with the invention. The oligomers are $C_8$ to $C_{20}$ hydrocarbons and are characterized by an average molecular weight of less than 1000. The desired polymer products are of an average molecular weight ranging from 50,000 to 200,000, whereas gels in polymer product, are characterized by average molecular weights of greater than 200,000, usually greater than 200,000 and up to about 300,000.

The Fluid Bed Reactor

Figure 1:
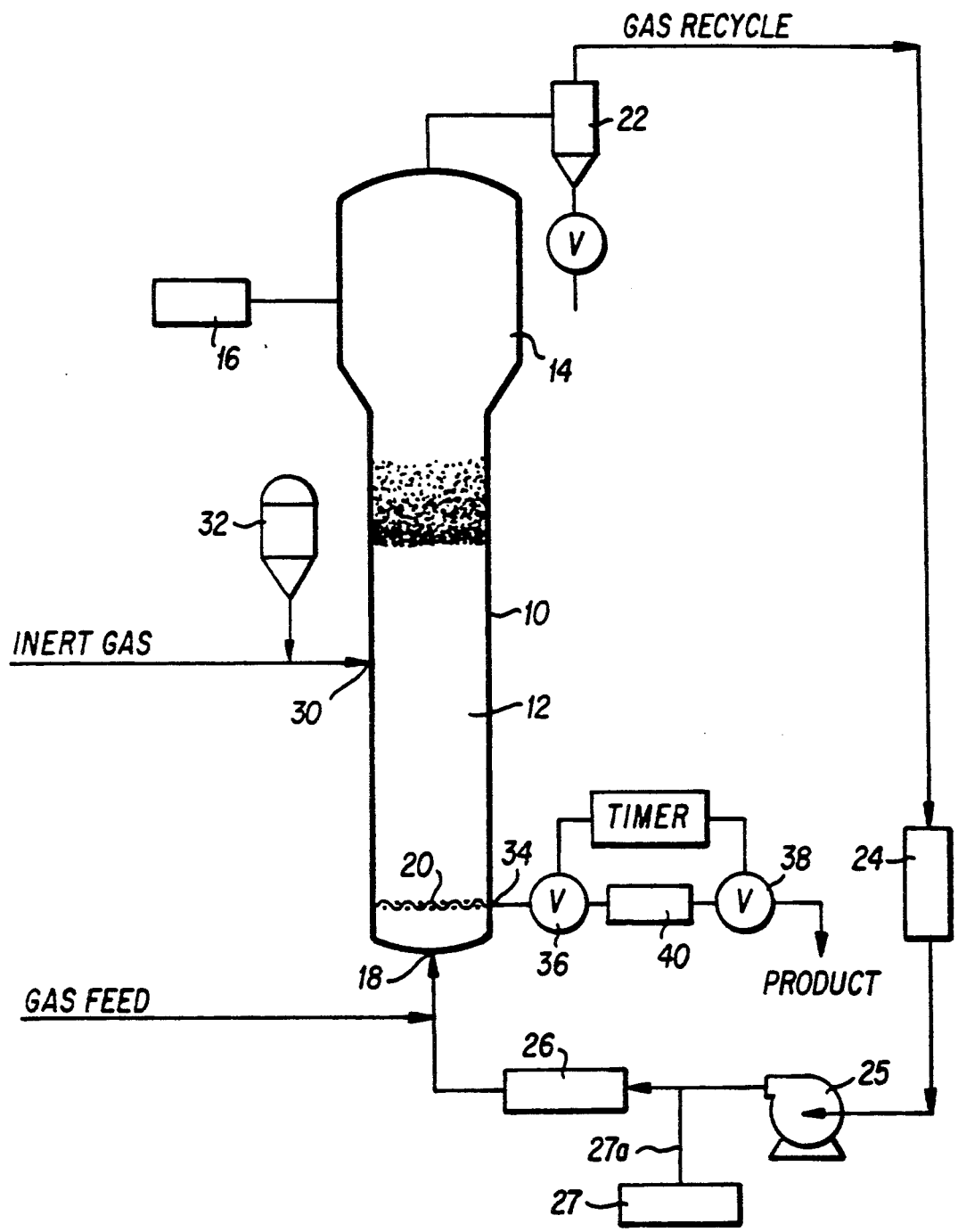
FIG. 1 is a fluidized bed reaction system which can be used in the practice of the process of the present invention.

A typical fluidized bed reaction system which could be used in the practice of the process of the present invention is shown in FIG. 1. With reference thereto, the reactor 10 consists of a reaction zone 12 and a velocity reduction zone 14. The importance of the function of the distibutor plate 20 will become apparent in the following discussion.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", *Chemical Engineering Progress Symposium Series*, Vol. 62, p. 100–111 (1966). The distribution plate 20 serves the purpose of diffusing recycle gas through the bed at a rate sufficient to maintain fluidization at the base of the bed as will be elaborated below.

It is essential that the bed always contains particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated catalyst used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing in the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. These are elements of the loop, sometimes referred as the closed-loop system. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Fouling occurs at the distributor plate 20. Although fouling occurs in all of the cold areas, areas at a temperature which is less than the dew point of the gaseous mixture in the reactor, distributor plate fouling is the one most easily detected, since it results in a rapid increase in the pressure drop across the distributor plate due to flow restriction. Such flow restrictions also result in changing fluidization patterns and contribute to reactor wall fouling. The lowest temperature in the reactor loop, is in the environs of the reactor inlet beneath the distributor plate. Other areas representing the coolest sections in the fluid bed reactor system include the cooler, piping between the cooler and the bottom head. These sections of the reactor system support low-temperature polymerization reactions.

Although we do not wish to be bound by any theory, it is our belief that oligomers, $C_8$–$C_{20}$ hydrocarbons, form in the solid resin phase and migrate to the gas phase as equilibrium between the two phases occurs. In the closed-loop recycle gas system, at low bleed stream vent conditions, accumulation of the oligomeric species—also generically termed "polyoils" occurs. The presence of these oligomeric compounds increases the dewpoint of the recycle gas stream, and at sufficiently high concentrations, starts condensing at the lowest temperature in the reactor loop, viz., the reactor inlet, beneath the distributor plate. The dew point temperature of a gas stream is the initial temperature at which liquid forms from the gas phase, e.g., on cooling. Increase in the dew point has been experimentally observed in the examples below. Furthermore, in conjunction with the theory of plate fouling and gel formation in the polymer products, the condensate thus formed provides a liquid phase which traps catalyst particles and sustains low-temperature polymerization beneath the distributor plate and at and around other cool spots in the reactor. The trapped catalyst particles continue to react in low temperature environments that lead to the formation of high molecular weight polymers. Over a period of time, these high molecular weight resins start to break, are dragged into the fluidized bed. Temperature cycling of the reactor appears to assist fouling layers, by heating up the bottom head.

The partially or completely activated catalyst is injected into the bed at a rate equal to its consumption at a point 30 which is above the distribution plate 20. Injecting the catalyst at a point above the distribution plate is important. Since the catalysts used in the practice of this invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

The particulate polymer product is preferably continuously withdrawn at a point 34 at or close to the distribution plate 20 and in suspension with a portion of the gas stream which is vented before the particulates settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

Gas from the compressor 25 of FIG. 1 is processed to remove products therefrom which are $C_8$–$C_{20}$ hydrocarbons. The processing steps are described in detail in Example 3 below, in conjunction with FIG. 2.

Figure 2:
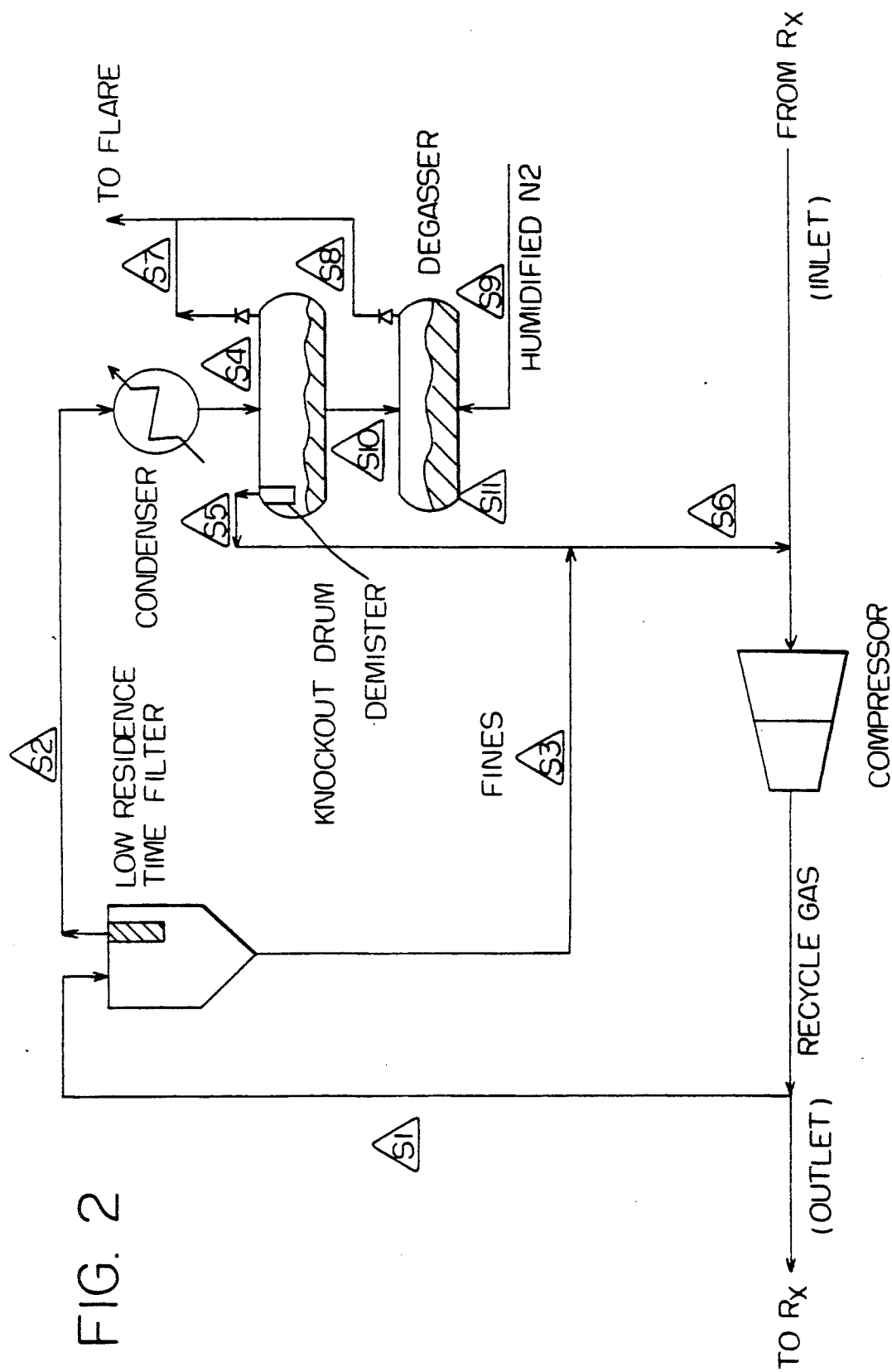
FIG. 2 is a flow diagram illustrating the process of the invention.

The oligomer removal system, as illustrated in FIG. 2, processes a small gas feed stream S1 which is taken from the compressor outlet. The gas passes through a low residence time filter to separate out any entrained resin fines and/or catalyst. The low residence time is necessary as any catalyst present continues to polymerize in the filter body, which is at reactor conditions. If it remains too long, the solids will foul the filter, shutting down the oligomer removal system. The solid fraction of the feed stream and a portion of the gas S3 are sent back to the compressor inlet. The gas which passes through the filter element S2 is processed to remove any oligomers present. The differential pressure across the compressor provides the driving force for the process.

The filtered gas stream S2 passes through a condenser where at least 50% of the oligomers condense out. The required condenser temperature varies with stream composition. The condensate is recovered in a knock-out drum which is filled with enough de-misting material to prevent any entrained liquid from leaving the drum. The remaining gas S5 is combined with the fines-containing stream from the filter S3 and sent to the compressor inlet as stream S6. The condensate S10 is sent to a degassing drum where it is purged with humidified nitrogen S9 to inert any alkyls which may be present. The condensate can be flared S8 or drained S11 from the tank for disposal.

The Process Conditions

The feed stream of gaseous monomer, with or without inert gaseous diluents, is fed into the reactor at a space time yield of about 2 to 10 pounds/hour/cubic foot of bed volume.

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96.

In a preferred embodiment of the invention the reactor inlet temperature is maintained at a temperature above the dew point of the gaseous contents of the reactor. The dew point will increase during the course of the polymerization (or copolymerization) run, if products of polymerization with molecular weights above those of the reactant(s), i.e., the oligomers, are present, as equilibrium between the reactant(s) and said products in the gaseous phase is reached. As the dew point of the gaseous mixture increases, fouling of the fluid bed reactor components at temperatures lower than that of the dew point of the gaseous mixture will occur.

The phenomenon of fouling occurs as a function of process conditions used in fluid bed low pressure gas phase reactors. Accordingly, fouling is independent of the catalyst system. Any catalyst system, such as that described in U.S. Pat. Nos. 4,302,556 or in 4,481,301, each of which is incorporated by reference herein, which is used for low pressure gas phase fluid bed ethylene polymer or copolymer production, can be used in this process.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a rate equal to its consumption at a point 30 which is above the distribution plate 20. Injecting the catalyst at a point above the distribution plate is important. Since the catalysts used in the practice of this invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

A gas which is inert to the catalyst such as nitrogen or argon is used to carry the partially or completely reduced precursor composition, and any additional activator compound or non-gaseous chain transfer agent that is needed, into the bed.

Hydrogen may be used as a chain transfer agent in the polymerization reaction of the present invention. The ratio of hydrogen/ethylene employed will vary between about 0 to about 2.0 moles of hydrogen per mole of the monomer in the gas stream. Any gas inert to the catalyst and reactants can also be present in the gas stream.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt index values of the copolymers that are produced. About 0 to 50, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent material, such as silica, of the types described above, in amounts of about 10 to 50 weight percent. These compositions tend to be pyrophoric. The zinc compound maybe added alone, or with any additional portions of the activator compound that are to be added to the reactor from a feeder, not shown, which could be positioned adjacent dispenser 27, near the hottest portion of the gas recycle system.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

EXAMPLES

EXAMPLE 1

The catalyst in these examples was chromocene impregnated silica. The amount of Cr on the catalyst was 1.2%.

In this example, the same catalyst batch was examined in two different reactors. In a commercial reactor, when the reactor inlet temperature was low during one campaign, condensation of polyoils from the gas phase occurred rapidly. This led to high gel levels in a relatively short period of time, concurrent with high plate pressure drop due to fouling. During another campaign, when the reactor inlet temperature was kept high (above 50° C.), plate life was much longer and gel levels were low for long periods of time.

In a pilot reactor, operated at substantially higher inlet temperature, condensation of polyoils did not occur. With the same catalyst batch, good quality resin was made. Also the ratio of vent (bleed) stream to feed stream was high, allowing effective control of polyoil accumulation levels. This led to low levels of gels in the resin. Thus formation of gels are not catalyst related, but are due to fouling of the distributor plate.

TABLE 1

|  | Reactor Temperature | | Vent/Feed | plate press drop | run duration | Gels (Bottle failure per 220 lbs resin) |
|  | Inlet | Outlet | | | | |
| --- | --- | --- | --- | --- | --- | --- |
| Campaign 1 (commercial Rx) | 40° C. | 100° C. | 0.015 | high | 1 week | >20 |
| Campaign 2 (commercial Rx) | 55° C. | 100° C. | 0.015 | low | 6 weeks | <5 |
| (pilot Rx) | 90° C. | 100° C. | 0.20 | low | not | 0 |

TABLE 1-continued

| Reactor Temperature | | | plate press | run | Gels (Bottle failure per |
| --- | --- | --- | --- | --- | --- |
| Inlet | Outlet | Vent/Feed | drop | duration | 220 lbs resin) |
| | | | | applicable | |

EXAMPLE 2

In this example, the presence of oligomers in the gas phase of the reactor system in sufficient quantities to measure by gas chromatograph was established. The collection of measurable quantity of the polyoils was achieved by passing a split stream of the recycle gases through a cold trap operated at low temperature (ca. 0° C.) for about 6 to 8 hours continuously in order to collect sufficient quantity for GC analysis. The oligomers present in minute quantities (<0.10 wt. % total reactor gases) altered the dew point of the gas mixture significantly from −37° C. to +24° C., as shown in Table 2. At typical commercial operating conditions, with the vent/feed ratio approaching 0.02 lbs/lb, the dew point of the reactor gas (45° C.) exceeds the typical reactor inlet temperature (40° C.), causing condensation at reactor inlet distributor plate. The amount of oligomers shown is illustrative of the catalyst system employed. For other catalyst systems, oligomer levels are different.

TABLE 2

Reactor temperature = 100° C.
Reactor Inlet temperature = 40° C.
Typical Reactor gas composition (without oligomers):

| Ethylene, psi | 240 | | |
| --- | --- | --- | --- |
| Hydrogen, psi | 9.6 | | |
| Nitrogen, psi | 60.4 | | |
| Total reactor pressure, psi | 310 | | |

Dew Point of Reactor gas (without oligomers) = −37° C.
Typical oligomer composition:

| vent/feed stream ratio | 5.0 | 0.25 | 0.02 |
| --- | --- | --- | --- |
| Octene, ppm wt | 180 | 750 | 1500 |
| Decene, ppm wt | 40 | 170 | 340 |
| Dodecene, ppm wt | 10 | 25 | 50 |
| Total gas phase oligomers, wt % | 0.023 | 0.095 | 0.19 |
| Dew point of reactor gas (with oligomers) | 6° C. | 24° C. | 45° C. |

EXAMPLE 3

In this example, controlling oligomer levels by the use of an oligomer removal system was operated continuously. Condensation may be used to separate the oligomers from the rest of the process gases. It maintains oligomer concentrations at levels well below those needed to condense out the oligomers on the process distributor plate. In this manner, distributor plate fouling and gels may be avoided.

This oligomer removal system, as illustrated in FIG. 2, processes a small gas feed stream S1 which is taken from the compressor outlet. The gas passes through a low residence time filter to separate out any entrained resin fines and/or catalyst. The low residence time is necessary as any catalyst present continues to polymerize in the filter body, which is at reactor conditions. If it remains too long, the solids will foul the filter, shutting down the oligomer removal system. The solid fraction of the feed stream and a portion of the gas S3 are sent back to the compressor inlet. The gas which passes through the filter element S2 is processed to remove any oligomers present. The differential pressure across the compressor provides the driving force for the process.

The filtered gas stream S2 passes through a condenser where at least 50% of the oligomers condense out. The required condenser temperature varies with stream composition. The condensate is recovered in a knockout drum which is filled with enough de-misting material to prevent any entrained liquid from leaving the drum. The remaining gas S5 is combined with the fines-containing stream from the filter S3 and sent to the compressor inlet as stream S6. The condensate S10 is sent to a degassing drum where it is purged with humidified nitrogen S9 to inert any alkyls which may be present. The condensate can be flared S8 or drained S11 from the tank for disposal.

The system shown was used for homopolymer products, although an identical oligomer removal system can be implemented for the production of copolymer resins. In addition, a system for recovering condensed comonomers from the split stream would be required. Therefore, the use oligomer removal system is equally applicable for homo-polymer and copolymer resins, with the major application being homopolymers.

TABLE 3

Operating Conditions:
Inlet temperature: 100° C.
Outlet temperature: 5° C.
Inlet pressure = compressor discharge pressure
Outlet pressure = compressor suction
Flow rate: 0.5% of recycle flow
Performance Summary:

| Initial Polyoil level = | 850 ppm wt | (Dew point = 26° C.) |
| --- | --- | --- |
| Polyoil level (after switching the ORS for 12 hours) | 800 ppm wt | (Dew point = 22° C.) |
| Amount of condensate (predicted) | | 60 g. |
| Amount of condensate (collected) | | 45 g. |
| Estimated collection efficiency | | 75% |

Composition of the condensate:
C8 = 13%   C10 = 40%   C12 = 31%   C14 = 13%   C16 = 3%

Thus it is apparent that there has been provided, in accordance with the invention, a process that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for catalytic fluidized bed gas phase reactor production of polymers of ethylene and copolymers of ethylene and a $C_3$-$C_{10}$ alpha olefin, at a pressure less than 1000 psi, and eliminating fouling of a distributor plate disposed in the reactor, wherein the process comprises:

passing a feed comprising ethylene to a fluidized bed of catalyst in said reactor, under ethylene gas phase polymerization conditions, and allowing said production to occur;

removing solid particulate product from the reactor;

allowing formation of oligomers, which are by-products of said production, in the gaseous phase in said reactor to result in a dew point of the gaseous phase in the reactor which exceeds the temperature of the distributor;

a) withdrawing at least a portion of the gaseous phase containing said oligomers, from said reactor, and cooling said portion of the gaseous phase to a temperature which is below the dew point of the gaseous phase b) to cause condensation of oligomers which are by-products of said production, and removing oligomers from the gaseous phase to produce a modified gas stream with a dew point which is less than the dew point of the gaseous phase; and introducing the modified gas stream, into the reactor.

2. The process of claim 1, wherein the modified gaseous phase is filtered and compressed.

3. The process of claim 2, wherein the gaseous phase is filtered and compressed, prior to cooling.

4. The process of claim 1, wherein the conditions include a temperature of about 30° to 115° C.

5. The process of claim 4, wherein the conditions include a temperature of about 75° to 95° C.

6. The process of claim 3, wherein the conditions include a temperature of about 30° to 115° C.

7. The process of claim 1, which further includes recovering resin product substantially free of gel.

8. The process of claim 6, which further includes recovering resin product substantially free of gel.

9. The process of claim 7, wherein the fluid bed reactor is operated at a pressure of from about 150 to 350 psi.

10. The process of claim 8, wherein the fluid bed reactor is operated at a pressure of from about 150 to 350 psi.

* * * * *